Jan. 17, 1967  A. D. WILEY  3,298,721
COUPLING BAND FOR JOINING CORRUGATED PIPES
Filed Jan. 14, 1964  2 Sheets-Sheet 1

INVENTOR.
ALLEN DALE WILEY,
BY Yungblut, Melville,
Strasser & Foster
ATTORNEYS.

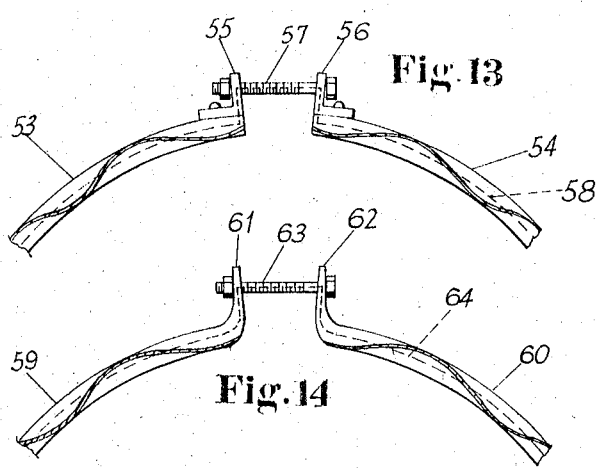
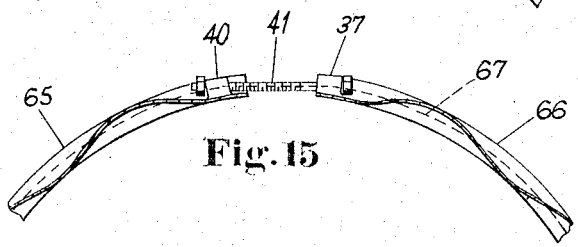
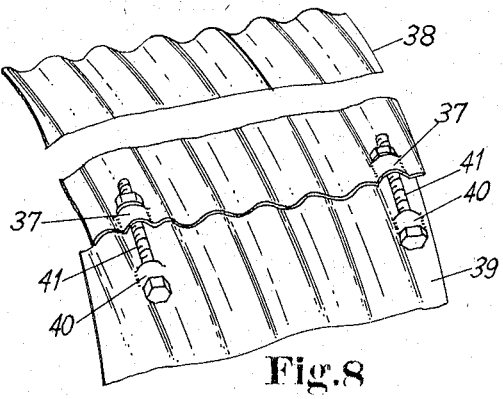
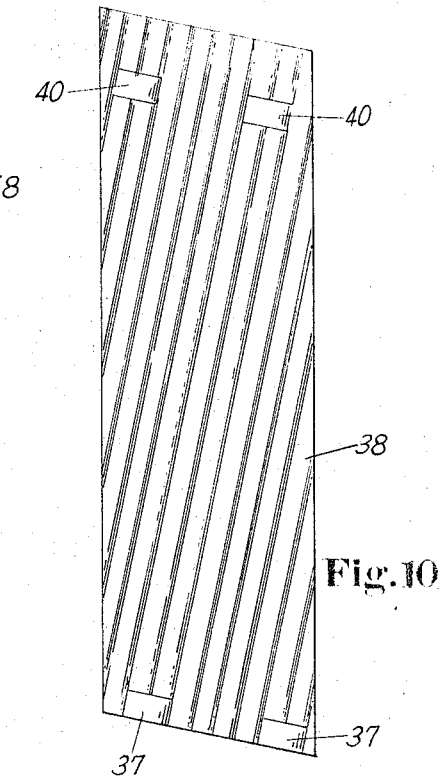
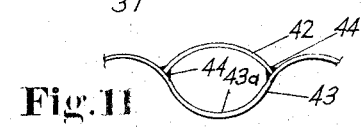
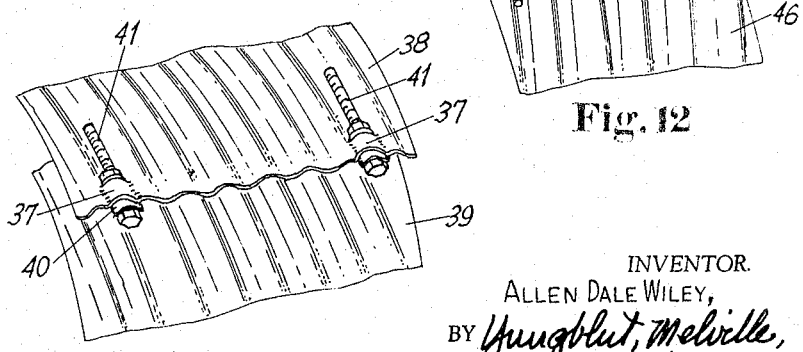

United States Patent Office 3,298,721
Patented Jan. 17, 1967

3,298,721
COUPLING BAND FOR JOINING CORRUGATED PIPES
Allen Dale Wiley, Middletown, Ohio, assignor to Armco Steel Corporation, Middletown, Ohio, a corporation of Ohio
Filed Jan. 14, 1964, Ser. No. 337,587
13 Claims. (Cl. 285—419)

The invention relates to coupling bands for corrugated pipe or culvert, and more particularly to coupling bands for pipes or culvert of the type having either helical corrugations or corrugations perpendicular to the long axis thereof.

Unlike the problem found in joining halves of nestable corrugated culvert, coupling bands for corrugated pipe or culvert, whether they be one piece or made up of several sections, must have at least one adjustable joint. In joining the halves of nestable corrugated culvert, the joints must be such as to hold the halves firmly together and to resist forces tending to decrease the diameter of the structure. However, with coupling bands the adjustable joint is provided to enable the band to be tightened about the two sections of pipe or culvert to be joined. The adjacent ends of the band forming the adjustable joint must be capable of being pulled together so that the band is tightened to exert circumferential pressure.

Heretofore a number of methods have been used to provide such an adjustable joint. For example, adjacent coupling band ends were provided with angle irons affixed thereto. One leg of each of the coacting angle irons was affixed to one of the band ends, while the other legs extended upwardly and outwardly in spaced relationship. These upwardly extending legs were provided with cooperating perforations through which bolts or other adjustable tightening means might be extended. When the bolts were tightened, the band ends would be drawn together, causing the coupling band to exert circumferential pressure on the pipe portions being joined.

In some instances the ends of the coupling bands themselves were provided with portions upturned at a 90° angle, and were provided with cooperating perforations for the receipt of bolts or other fastenings.

Such coupling bands require the formation of special ends or end pieces; are expensive to manufacture; and often exert greater pressure at the adjustable joint than throughout the remainder of the band. It is therefore an object of the present invention to provide a coupling band with a greatly simplified adjustable joint.

It is an object of the present invention to provide a coupling band which is easy and inexpensive to manufacture.

It is an object of the present invention to provide a coupling band having an adjustable joint of great strenghth.

It is an object of the present invention to provide a coupling band capable of exerting substantially equal circumferential pressure throughout its length.

It is an object of the invention to provide a coupling band which in one embodiment may be made of two or more sections.

It is an object of the present invention to provide a coupling band which in another embodiment may be made of two or more sections each having interchangeable end portions.

These and other objects of the invention which will be described hereinafter or will be apparent to one skilled in the art upon reading this specification, are accomplished by that structure and arrangement of parts of which certain exemplary embodiments will now be described. Reference is made to the accompanying drawings wherein.

Figures 2, 3, 6:
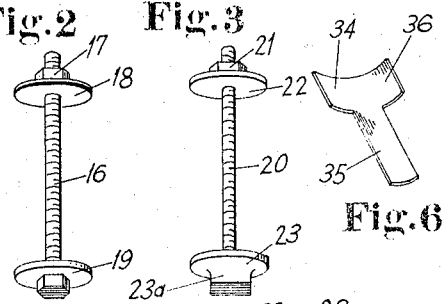
FIG. 2 is a perspective view of one form of tightening means.
FIG. 3 is a perspective view illustrating a second form of tightening means.
Figure 7:
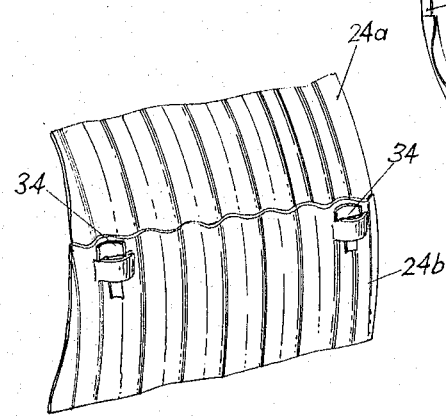

FIGS. 6 and 7 relate to one form of non-adjustable joint for a multi-piece coupling band of the present invention.

FIG. 8 illustrates two forms of lugs in an adjustable joint of the present invention.

FIG. 9 illustrates the adjustable joint of FIGURE 8, with the lugs overlapped.

FIG. 10 illustrates in flat one section of a multipiece coupling band having two forms of lugs.

FIG. 11 illustrates a welded lug for an adjustable joint of the present invention.

FIG. 12 is a partial view illustrating another form of adjustable joint, and another form of lug and adjustable tightening means.

FIGS. 13 and 14 illustrate for comparison certain hitherto used adjustable joints in coupling bands, showing the directions of the forces involved.

FIG. 15, again for comparison, illustrates one form of the joint of this invention, also showing the directions of the forces involved.

While it will be understood by one skilled in the art that the coupling band of the present invention may be made for corrugated pipe or culvert wherein the corrugations are perpendicular to the long axis thereof, for purposes of an exemplary showing, the band of the present invention will be described with respect to pipe or culvert having helical corrugations such as are well known in the art.

Figure 1:
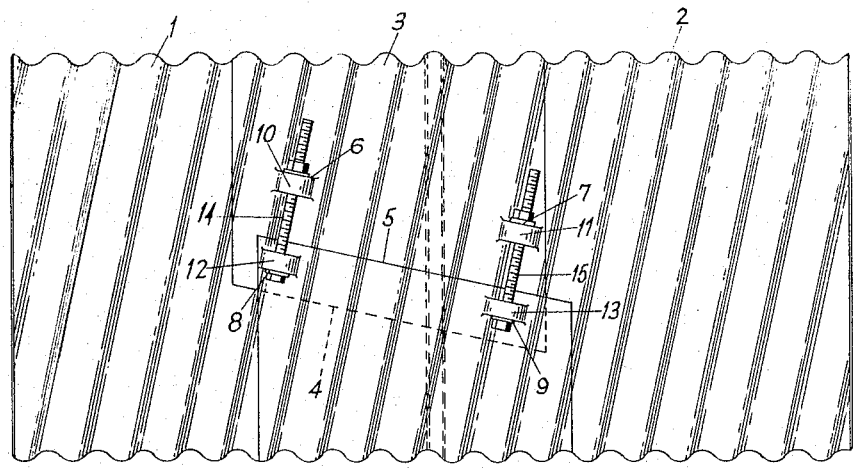
FIG. 1 illustrates one embodiment of the present invention comprising a one piece coupling band having an adjustable joint of the present invention.

FIG. 1 illustrates an embodiment of the coupling band of the present invention comprising a one piece band construction. While the band may be fabricated from sheet metal, having corrugations of the proper pitch formed therein, and afterward curved to cause the corrugations to assume the helical configuration, it has been found equally satisfactory to form the one-piece band from a section of helically or straight corrugated pipe of slightly larger diameter than the pipes to be joined. This is done by making cuts in the larger diameter pipe perpendicular to its long axis. The band may be of any suitable width, and the diameter thereof will be limited only by convenience of manufacture and handling. When a band is made in this fashion a single cut will be made in the section taken from the larger diameter pipe substantially perpendicular to the circumferential direction of the helical corrugations, to form an open band.

At or near the band ends, pairs of parallel spaced slits are made in selected ones of the valleys of the corrugations. These slits are substantially perpendicular to the circumferential direction of the corrugations.

That portion of the band lying between each pair of slits is then raised upwardly to form an arch. Each such arch will serve as an embossed lug for a bolt or other suitable tightening means.

FIG. 1 illustrates two pieces of helically corrugated pipe 1 and 2 joined together by a unitary coupling band 3. In this instance the band 3 is either specially fabricated or cut from a helically corrugated pipe of slightly larger diameter than the pipes 1 and 2. At or near the band ends 4 and 5 parallel pairs of slits 6 through 9 are provided in selected ones of the valleys of the corrugations. The portions between the pairs of slits are then raised to form lugs 10 through 13. Cooperating pairs of lugs (i.e. lugs 10 and 12 and lugs 11 and 13) are then engaged with any suitable adjustable tightening means. FIG. 1 shows the use of bolts 14 and 15.

FIG. 2 illustrates one form of adjustable tightening means comprising a bolt 16, a nut 17 and washers 18 and 19. While the washers 18 and 19 may be of the usual circular type, it has been found preferable to form washers of a substantially oval configuration to conform more nearly to the shape described by the valley of the corrugation and the lug. A washer of such configuration tends to distribute the force drawing cooperating lugs toward each other more evenly throughout the lug length.

Another form of adjustable tightening means is shown in FIG. 3. This form comprises a bolt 20, a nut 21 and washer 22. In this embodiment the washer 22 may again be of a substantially oval configuration, and the bolt head 23 is also of a substantially oval configuration. This eliminates the necessity of providing more than one washer. It will be understood by one skilled in the art that the lug portion 23a of the bolt head 23 may be eliminated if desired, resulting in a bolt head of a flat, oval configuration.

The method of use of the coupling band of FIG. 1 is as follows: When the pipes or culverts 1 and 2 are of considerable length, the band 3 being of slightly larger diameter may be slipped over one of the pipe ends to be joined. The pipe ends are then abutted with proper orientation of the corrugations, and the band 3 is drawn back over the pipe joint. The bolts 14 and 15 are then passed through their respective lugs and tightened, drawing the band ends 4 and 5 together.

In some instances it is preferable to have the lugs 10 through 13 spaced inwardly from the band ends, permitting the band ends to overlap when the band is tightened. It has been found in practice that this construction results in a band which exerts substantially equal circumferential pressure throughout its length, with an adjustable joint of remarkable strength.

Figure 4:
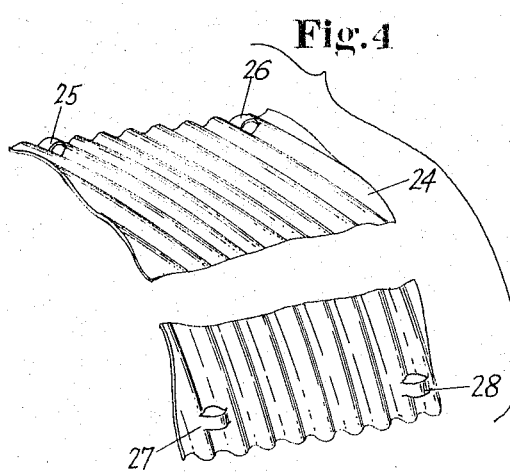
FIG. 4 is a perspective view of one section of a multi-piece coupling band.
Figure 5:
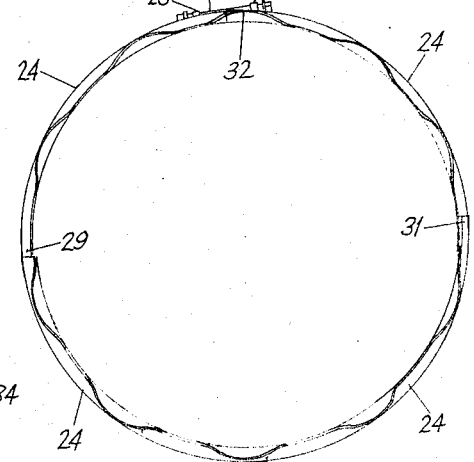
FIG. 5 is a cross sectional view illustrating a fully assembled multi-piece coupling band.

When dealing with pipe or culvert of large diameter, it may be found preferable to provide a coupling band made up of several sections. This is true because a one-piece band would be heavy and awkward to handle. FIGS. 4 and 5 illustrate an embodiment of the present invention wherein the band comprises two or more sections. FIG. 4 illustrates a band section comprising a metallic member having helical corrugations. It will be understood by one skilled in the art that the band section 24 will be provided with corrugations of suitable pitch so as to correspond to the corrugations of the pipe or culvert ends to be joined. The sections will also be provided with a lengthwise curvature of a radius equal to the radius of the band to be formed. As shown in FIG. 4, the band section is provided with lugs 25 through 28 formed at or near the section ends in the manner described above. As will be understood by one skilled in the art, such band sections will be interchangeable end for end.

FIG. 5 is a cross sectional view showing the use of an exemplary coupling band comprising four sections of the type shown in FIG. 4. While the band sections may be joined together by adjustable tightening means at all of the joints, it is necessary only to provide one adjustable joint. Thus joints 29, 30 and 31 may be non-adjustable, while adjustable tightening means will be used at the remaining joint 32 to permit tightening of the band. Tightening means for the joint 32 may be of any suitable adjustable type. In FIG. 5, the cooperating pair of lugs 26 and 28 are shown joined by a bolt 33 which may be of the type shown in FIGS. 2 or 3.

At 29, 30 and 31 the band sections 24 may be joined by any suitable non-adjustable means including hooks, clips, links or wedges. For example, use may be made of wedges similar to those shown in United States Patent No. 2,540,141 issued February 6, 1951 to G. E. Shafer. One such wedge is illustrated at 34 in FIG. 6. The T-shaped wedge has an elongated shank 35 and a head 36 which is wider than the lugs formed in the ends of the band sections. The wedge 34 is given a transverse curvature so that it may conform to a valley of the corrugations of the band sections.

The use of such wedges is illustrated in FIG. 7. Two band sections 24a and 24b are overlapped at their ends so that the lugs of band section 24a extend upwardly through the perforations in band section 24b formed by its lugs. With the lugs of band section 24a lying directly beneath and nesting with the lugs of band section 24b, wedges 34 are passed beneath the lugs of both band sections, joining the sections together in nonadjustable fashion.

FIG. 8 illustrates another form of lug which may be provided on band sections such as that illustrated in FIG. 4, or unitary bands such as the one illustrated in FIG. 1. In this instance, the lugs 37 are located at the edge of the band or band-sections 38. The lugs 37 may be formed in the same manner as that described above, except that in this instance only one slit is necessary to form such a lug. This is true, because the forwardmost edge of the lug is also the forwardmost edge of the band or band-section.

FIG. 8 shows how the band 38 having lugs 37 may be joined with a band section 39 having lugs 40 similar to those shown in FIGS. 1 and 4. The joining means 41 are illustrated as bolts, which may be of the type illustrated in FIGS. 2 and 3. It will be noted that this method of joinder is similar to that described above. However, as illustrated in FIG. 9, since the lugs 37 are located at the edge of the band 38, the band-sections 38 and 39 may be tightened together to the extent that the lugs 37 will substantially overlap the lugs 40.

It will be understood, by one skilled in the art, that band-sections such as those shown in FIGS. 4 and 5, may be provided at both ends with lugs of the type shown at 37 in FIG. 8, or may be provided with such lugs at one end and lugs of the type illustrated in FIG. 4 at the other. (See FIGURE 10). In the first instance, the band-sections would be identical to each other and interchangeable end for end. In the second instance, while the bands would be identical, the preferred use would be to join band ends bearing respectively the two different types of lugs. FIGS. 8 and 9 for example, illustrate such a joint.

It will be understood by one skilled in the art that the lugs of the present invention (i.e. of the type shown in FIG. 4 and of the type shown in FIG. 8) may be made as separate pieces, welded to appropriate portions of the band. This is illustrated in FIG. 11 wherein the lug 42 is a separate piece affixed to the band 43 in any suitable manner, such as by welding or the like, as at 44. Such a construction leaves the valey 43a of the corrugation over which the lug 42 is located intact, which would be of value where a waterproof or semi-waterproof joint is desired.

FIGURE 12 illustrates another form of lug which may be provided on band sections such as that illustrated in FIGURE 4, or unitary bands such as the one illustrated in FIGURE 1. For purposes of an exemplary showing, two band sections 45 and 46 are illustrated in part. The section 46 may have any form of lug herein described, but is illustrated as having lugs as at 47, similar to the lugs 37 in FIGURES 8, 9 and 10. The lug 48 on section 45 is formed by making a single slit 49 in the valley of an appropriate corrugation. That portion of the section adjacent the slit, and on that side of the slit nearest the band section end is then raised upwardly as at 50. Thus a substantially oval perforation is formed in the band section, which perforation faces away from the band end.

Any suitable adjustable tightening means can be used with the lug 48, and one such tightening means is illustrated at 51 in FIGURE 12. The tightening means 51 may be a bolt-like member generally similar to the tightening means illustrated in FIGURES 2 and 3. However, in this instance the end opposite the threaded end is bent over as at 52 to form a hook. The hook portion 52 is adapted to engage the lug 48 as shown in FIGURE 12.

In FIGS. 13, 14 and 15, a comparison may be drawn between exemplary forms of hitherto used bands, and the band of the present invention. In FIG. 13 the band or band-sections 53 and 54 are provided at their ends with angles 55 and 56 respectively. The angles may be affixed to the bands in any suitable manner, including riveting or the like. The upstanding legs of the angles are provided with matching perforations, so that bolts may be used to connect the angles. Such a bolt is shown at 57. The dotted line 58 represents the lines of force in such a joint, and it will be noted that the tendency would be to cause the upstanding portions of the angles to bend toward each other, or to cause the angles themselves to tilt toward each other. This sort of coupling is not efficient and may tend to cause the bands to exert greater circumferential pressure on the culverts to be joined in those places where such band joints occur.

FIG. 14 illustrates another form of hitherto used band joint. Here, the band or band sections 59 and 60 are provided with integral upturned ends 61 and 62 respectively, which ends are not corrugated. Again, these upturned ends are provided with matching perforations through which bolts may pass as at 63. The dotted line 64 again represents the lines of force, and it will be noted that they tend to cause the upstanding ends 61 and 62 to bend toward each other. In other words, tightening of the bolt 63 would tend to cause the ends 61 and 62 to bend toward each other rather than to draw the ends of bands 59 and 60 together.

FIG. 15 illustrates band sections of the present invention designated at 65 and 66. For purposes of an exemplary showing, FIG. 15 illustrates a joint of the type shown in FIG. 8. The dotted line 67, representing the lines of force, is continuous in its direction, since the fastening means (i.e. the lugs 37 and 40, and the bolt 41) are quite close to the circumference of the pipe or culvert sections to be joined. Such a structure results in an efficient joint of remarkable strength.

Modifications may be made in the invention without departing from the spirit of it. For example, the unitary band of FIG. 1 or the band sections of FIGS. 4, 8 and 12 may be provided with non-helical corrugations for use with pipe or culvert having non-helical corrugations.

The invention having been described in certain exemplary embodiments, what is claimed as new and desired to be secured by Letters Patent is:

1. Means for joining sections of corrugated pipe in substantially abutting end to end relationship, said means comprising an open band member formed of at least one piece of metal corrugated generally in the direction of its length and curved longtiudinally to fit over the ends of abutting sections of corrugated pipe, the length of said member being sufficient to form a constricting band when positioned about the ends of said pipe, end portions of the outer surface of said band having cooperating sets of integral lugs struck upwardly from valleys of said corrugations therein, said lugs being adapted for the engagement of contracting fastening members.

2. The structure claimed in claim 1 wherein said lugs on at least one of said end portions are spaced sufficiently from the end of said band to permit an overlap, said overlap increasing as said band is tightened.

3. The structure claimed in claim 1 wherein said lugs on at least one of said end portions are located directly at the end of said band.

4. The structure claimed in claim 1 wherein the corrugations in said band lie at an angle with respect to the longitudinal axis thereof, whereby said band may be used with sections of helically corrugated pipe with the corrugations of the band mating with the corrugations of the pipe sections to be joined.

5. The structure claimed in claim 1 wherein said band is formed from a section of corrugated pipe of larger diameter than the sections to be joined.

6. The structure claimed in claim 1 wherein said band member is formed from a plurality of band sections of corrugated metal fastened together at positions near their respective ends.

7. The structure claimed in claim 1 including said contracting fastening members comprising bolts, said bolts having a head at one end and a nut and washer at the other end, said head and said washer being substantially oval so as to more nearly conform to the shape described by said lugs and said valleys.

8. The structure claimed in claim 7 wherein said lugs on at least one of said end portions are spaced sufficiently from the end of a band section to permit an overlap.

9. The structure claimed in claim 7 wherein at least one set of said lugs is located directly at the end of a band section.

10. The structure claimed in claim 1 including said contracting fastening members comprising bolts, said bolts having a hook at one end and a nut and washer at the other end.

11. The structure claimed in claim 1 wherein said lugs are defined by spaced parallel slits extending transversely of their respective valleys.

12. Means for joining sections of corrugated pipe, in substantially abutting end to end relationship, said means comprising an open band member formed of at least one piece of metal corrugated generally in the direction of its length and curved longitudinally to fit over the ends of abutting sections of corrugated pipe, the length of said band member being sufficient to form an overlap when positioned about the ends of said pipe, end portions of said band having strap-like lugs struck upwardly from the valleys of corrugations therein, and defined by spaced parallel slits, said lugs being adapted for the engagement of contracting fastening members, and said lugs being spaced sufficiently from the ends of said band to permit an increase in said overlap as said band is tightened.

13. Means for joining sections of corrugated pipe in substantially abutting end to end relationship, said means comprising an open band member formed of at least one piece of metal corrugated generally in the direction of its length and curved longitudinally to fit over the ends of abutting sections of corrugated pipe, the length said band member being sufficient to form a constricting band when positioned about the ends of said pipe, end portions of the outer surface of said band having cooperating sets of lugs extending upwardly from valleys of said corrugations therein, said lugs comprising individual strap-like arcuate members affixed at their ends to said outer surface of said end portions of said band in such a way as to extend transversely of their respective valleys, said lugs being adapted for the engagement of contracting fastening members.

References Cited by the Examiner
UNITED STATES PATENTS

| | | | |
|---|---|---|---|
| 890,256 | 6/1908 | Bayer | 138—159 |
| 901,569 | 10/1908 | Voris | 138—173 |
| 912,638 | 2/1909 | Wold | 285—419 X |
| 1,010,450 | 12/1911 | Olsen | 138—159 |
| 1,771,167 | 7/1930 | Dolan | 285—424 X |
| 1,839,761 | 1/1932 | Hutton | 285—419 X |
| 2,540,141 | 2/1951 | Shafer | 138—158 |

CARL W. TOMLIN, *Primary Examiner.*

THOMAS F. CALLAGHAN, *Examiner.*